United States Patent [19]
MacNeil et al.

[11] Patent Number: 5,340,136
[45] Date of Patent: Aug. 23, 1994

[54] CYLINDER CART WITH MAGNETICS

[75] Inventors: Ralph M. MacNeil, Dieppe; Samir F. Coutya, Pte Claire; Mohand Abdelli, Montreal, all of Canada

[73] Assignee: Canadian Liquid Air Ltd., Montreal, Canada

[21] Appl. No.: 940,999

[22] Filed: Sep. 4, 1992

[51] Int. Cl.$^5$ ............................. B62B 3/04
[52] U.S. Cl. ...................... 280/472; 280/47.24; 280/47.35; 414/606
[58] Field of Search ............ 280/47.17, 47.19, 47.24, 280/47.26, 47.34, 47.35, 79.3, 79.6, 47.2; 901/40; 414/737, 606, 910, 911

[56] References Cited

U.S. PATENT DOCUMENTS

| | | | |
|---|---|---|---|
| 1,738,096 | 12/1929 | Cole | 280/47.2 |
| 1,913,295 | 6/1933 | Schreck | |
| 2,381,858 | 8/1945 | Austin | 280/47.24 |
| 2,463,967 | 3/1949 | Hefelfinger | 280/54 |
| 2,612,386 | 9/1952 | Schutzer et al. | 280/54 |
| 2,616,720 | 11/1952 | Knoth | 280/43 |
| 2,622,750 | 12/1952 | Ehlers | 414/606 |
| 2,654,493 | 10/1953 | Kernkamp | 214/374 |
| 3,064,990 | 11/1962 | Salvucci | 280/47.2 |
| 3,081,892 | 3/1963 | Cook | 214/371 |
| 3,155,256 | 11/1964 | Cook | 214/371 |
| 3,662,803 | 5/1972 | Kuvik | 150/52 |
| 3,762,739 | 10/1973 | Tabet | 280/47.37 |
| 4,098,416 | 7/1978 | Fawley | 280/47.24 |
| 4,448,440 | 5/1984 | Gier | 280/655 |
| 4,534,576 | 8/1985 | Jones, Jr. | 280/47.26 |
| 4,762,193 | 8/1988 | Levine | 280/47.2 |
| 4,842,139 | 6/1989 | Krieg | 280/79.6 |
| 5,071,148 | 12/1991 | Salvucci, Sr. | 280/47.24 |

*Primary Examiner*—Richard M. Camby
*Attorney, Agent, or Firm*—Rothwell, Figg, Ernst & Kurz

[57] ABSTRACT

A hand cart for transporting gas cylinders has a magnetic bed arrangement for securing the steel cylinders to the cart during the pick-up and transportation operation. A cam-operated discharge arrangement, operated by foot-pedal, serves to separate the cylinders from the permanent magnets of the cylinder bed, permitting withdrawal of the cart from the cylinders, when deposited in an upstanding, working orientation.

2 Claims, 4 Drawing Sheets

CYLINDER CART WITH MAGNETICS

TECHNICAL FIELD

This invention is directed to a cylinder transportation cart, and in particular to a hand cart with magnetic beds for picking up and transporting steel cylinders such as gas cylinders.

BACKGROUND ART

Cylinders for transporting compressed gas such as oxygen, nitrogen, carbon monoxide and carbon dioxide, to name but a few, may come in small to medium sizes and are frequently transported in pairs by hand cart to and from their point of use.

The pressure control valve and access tubing are usually screwed on to a valve fitting, located on the necked end of the cylinder, at the point of use, and the cylinders, frequently in the size range four and one half inches diameter to nine inches diameter are stood upright on their base.

Transportation of the cylinders, which may each weigh as much as about 270 pounds is generally effected by two-wheeled hand truck. In order to insert the base plate or step portion of the truck beneath the cylinders, it is first necessary to move the cylinders away from the wall of their work station, in order to enable them to be tilted rearwardly on their base, for insertion of the truck base plate or step therebeneath.

Such removal and manipulation is characteristically effected using the neck of the cylinder, and frequently the cylinder control valve, for maximum convenience and control, frequently to the detriment of the control valve.

Also, in removing the cylinders, whether full or empty from off the truck step, for stacking on a truck, or for use at a work station, the hands of the operator are in jeapardy when carrying out the operation in close quarters, due to the need to support the bottles from behind as they are tipped forward and slid off from the step.

It will further be recognized that careless handling of the cylinders presents the likelihood of damage to the cylinders and more particularly the shut-off valves, and even an outside possibility of gas leakage or cylinder rupture.

SUMMARY OF THE INVENTION

The present invention provides a wheeled cart for transporting cylinders, such as gas cylinders. Thus, there is provided a cart having a magnetic bed for securing ferritic gas cylinders in attached relation to the cart, for transportation thereby.

In accordance with the present invention the magnetic bed may be of sufficient magnetic power to enable the transfer to the cart, in supported relation of the gas cylinders, within a predetermined size and weight range, without requiring manual contact with the cylinders.

In a preferred embodiment of the present invention, a cart having a magnetic bed is provided wherein the magnetic beds is substantially self-adjusting to the curvature of the cylinder outer surface.

In one such embodiment a plurality of permanent magnets are resiliently mounted in the magnetic bed, to permit individual accommodation thereof to the surface of the cylinder.

In one aspect of the invention, a magnetic bed having a pair of surfaces, each faced with a plurality of permanent magnets is provided wherein the two surfaces are relatively movable, to accommodate to the radius of curvature of the cylinder in use.

One embodiment of the invention incorporates a rubber backing for the permanent magnets, by which the magnets can bear resiliently in self-adjusting relation with the surface of the cylinder, so as to provide maximum attractive force between each magnet and the surface of cylinder.

The outer, contact face of each of the magnets may be curved along its length in order to better accommodate to the curvature of the cylinder.

A cam arrangement may be provided, to assist in displacing the magnetic beds away from the cylinders.

One cart embodiment has a pair of cylinder beds in side by side arrangement, each with a respective upper and lower magnetic bed portion wherein each upper bed portion and each lower bed portion comprises a pair of laterally displaced half-beds that are mutually pivotally connected, so as to better adjust to the respective cylinder surface. In such an embodiment a pedal operated cam arrangement provides a pivotal cam plate, located between each pair of half beds. When inactive, the cam plate rests against or adjacent the cylinder surface. Upon actuation of the cam operating foot pedal, the respective cams are pivoted outwardly in force-applying relation against the adjacent cylinder surface, thereby displacing the cart away from the cylinder, by reaction force. Thus, with the cylinder or cylinders deposited on their end, standing against a wall or other support, actuation of the cam plates displaces the magnetic beds rearwardly, away from the cylinder surfaces, thereby reducing the magnetic attraction between cart and cylinders to the point of ineffectiveness. The cart may then be readily withdrawn.

In the preferred embodiment, the magnetic cart has a pair of fixed wheels and a pair of castoring rear wheels. The cart frame is so shaped that when tilted forwardly to bring the magnetic beds into a vertical position the rear wheels are clear of the ground. After attachment to or disengagement from a cylinder or cylinders, the cart may be pivotted rearwardly, onto its four wheels, thereby inclining the cylinders in resting, supported relation upon the cart.

When picking up gas cylinders this rearward pivotting motion has the effect of raising the base of the gas cylinders clear of the ground.

When in a rearwardly inclined position of the cart, a component of cylinder weight is transformed to the cart frame, thereby reducing the magnetic attraction necessary to retain the cylinders immoveable on the magnetic beds. This in effect produces an automatic safety margin of magnetic attractive force holding the cylinders to the cart. At the same time, a potential frictional reactive force component is introduced, to further stabilize the cylinders with the cart.

BRIEF DESCRIPTION OF THE DRAWINGS

Certain embodiments of the invention are described by way of illustration, without limitation of the invention thereto, reference being made to the accompanying drawings, wherein.

BEST MODE OF CARRYING OUT THE INVENTION

Figure 2:
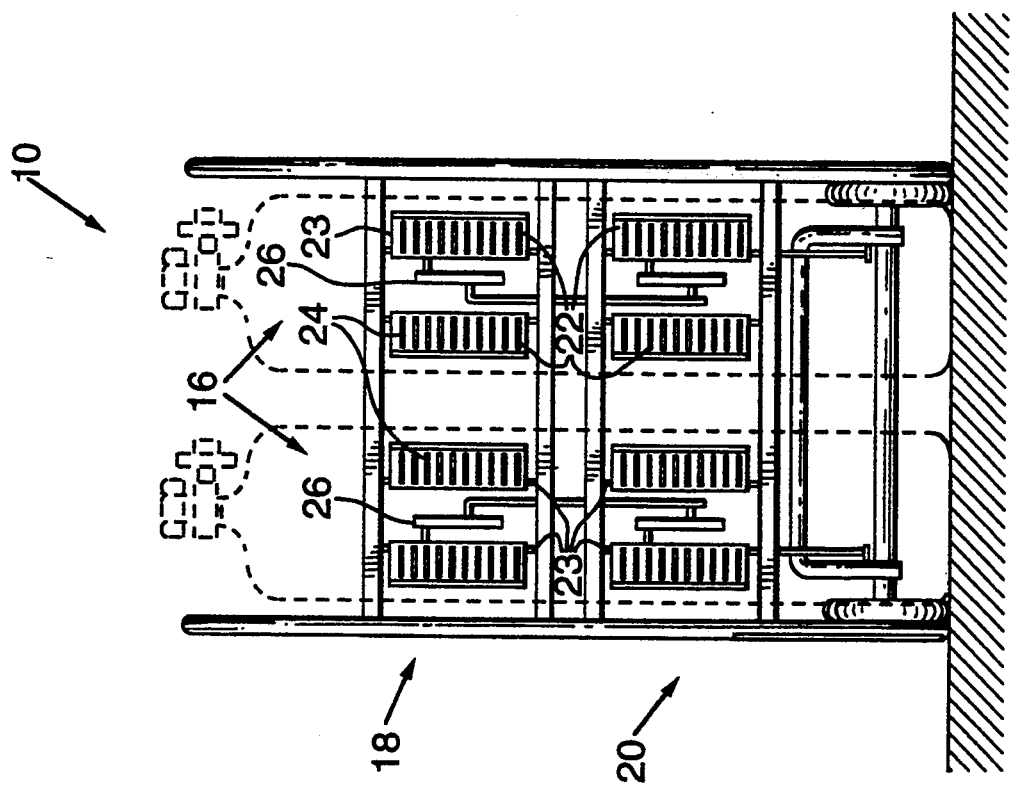
FIG. 2 is a front view of the cart of FIG. 1.
Figure 1:
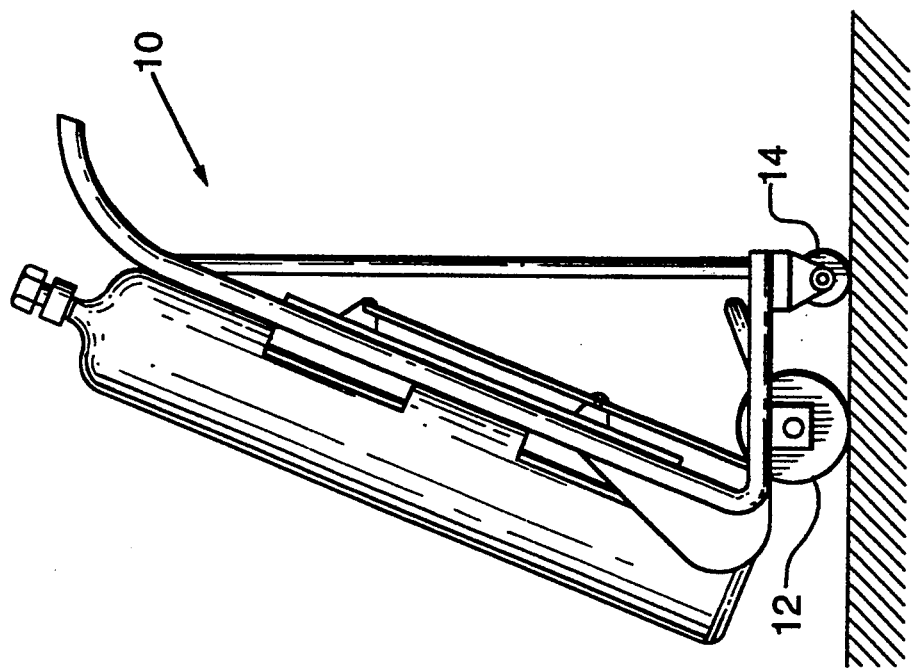
FIG. 1 is a side view, in elevation, showing a gas cylinder mounted upon a cart in accordance with the present invention.
Figure 5:
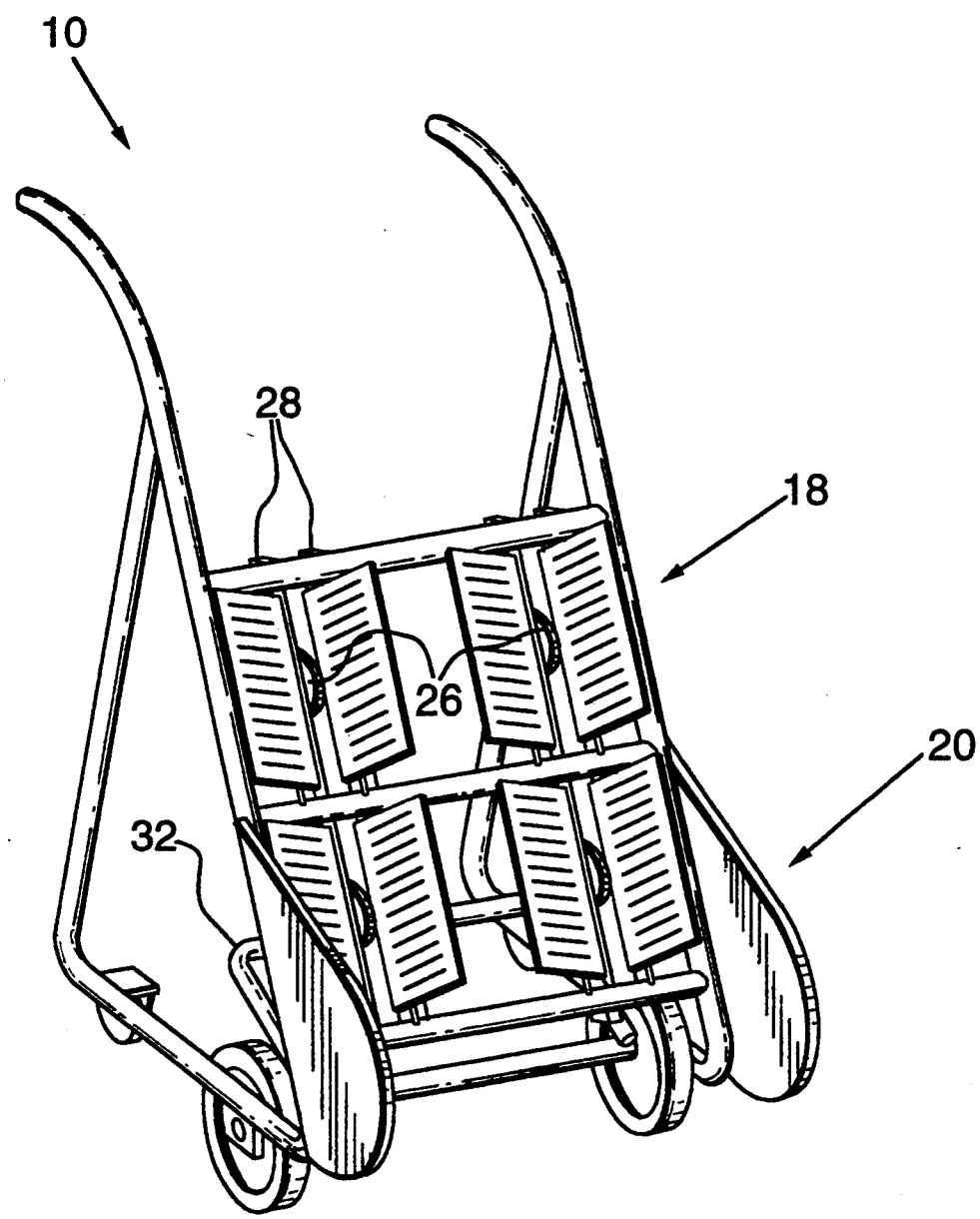
FIG. 5 is a perspective front view of a subject cart.

Referring to FIGS. 1 and 5, a magnetic hand cart 10 in accordance with the present invention has a tubular frame 11 supported by a pair of main wheels 12 at the front and a pair of small castoring wheels 14 at the rear.

The care 10 is illustrated as having two cylinder beds 16, each comprising an upper magnetic half-bed 18 and a lower magnetic half-bed 20.

Each magnetic half-bed 18,20 comprises a pair of magnetic plates 22 (FIG. 6) pivotally mounted at a respective pivot point 23 to a respective transverse frame member of the cart 10, for pivotal conformity with the surface of a respective cylinder to be transported.

Figure 4:
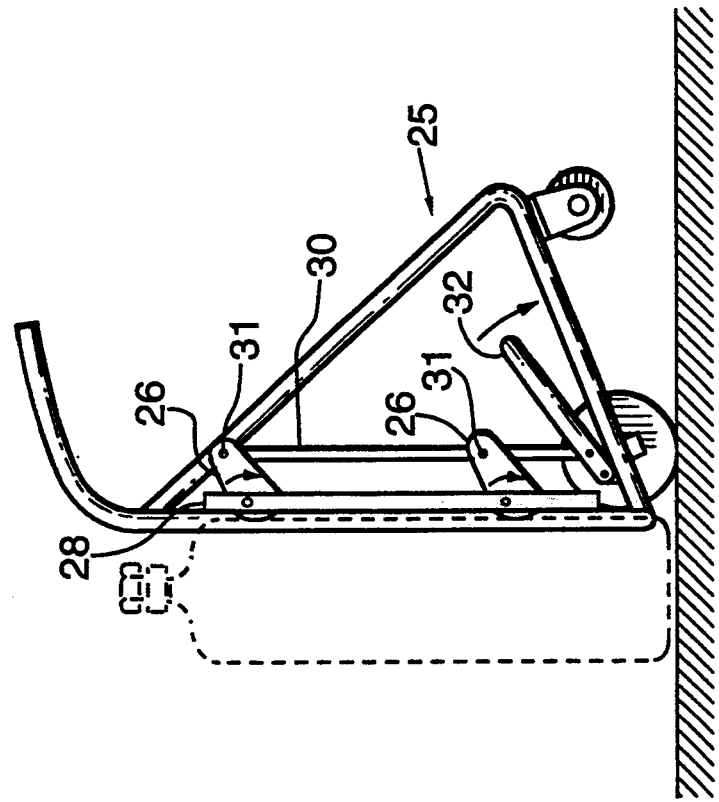
FIG. 4 is a partial side view of a portion of the cart, showing the ejection mechanism.
Figure 3:
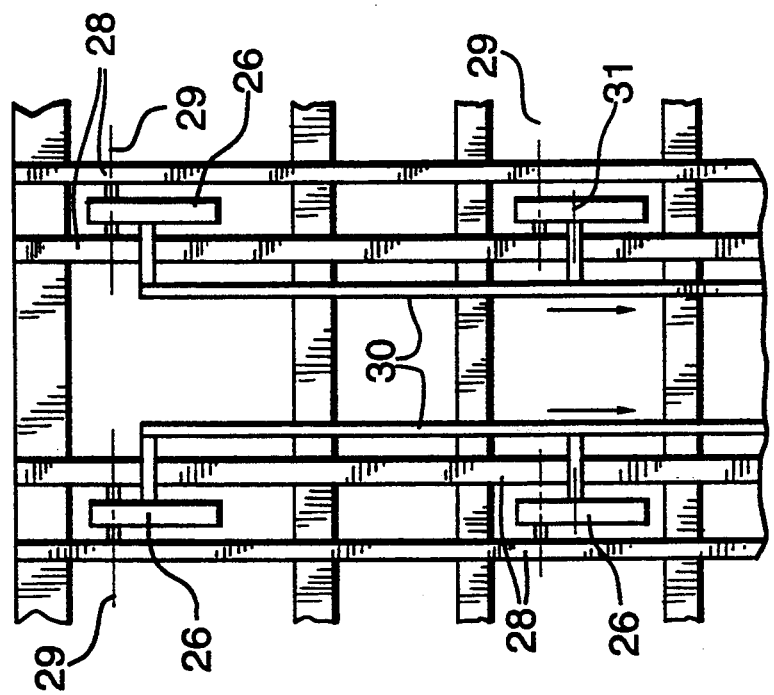
FIG. 3 is a partial view, from the rear of the cart, showing a portion of the cam linkage of the ejection mechanism.

Referring to FIGS. 3 and 4, a cylinder push-off system 25 comprises a plurality of four cam plates 26, one for each magnetic half-bed 18,20. Four rectangular section rib members 28 forming part of the structure of cart 10 carry the cam plates 26 in pivotally supported relation therebetween, for rotation about pivotal axes 29.

A pair of pull rods 30 extending parallel with rib members 28 are each pivotally connected at 31 to a respective pair of cam plates 26, and to foot pedal 32.

The foot pedal 32 (See FIGS. 1, 4 and 5) extends laterally across the cart 10, being pivotally supported therefrom at its lower end.

Figure 6:
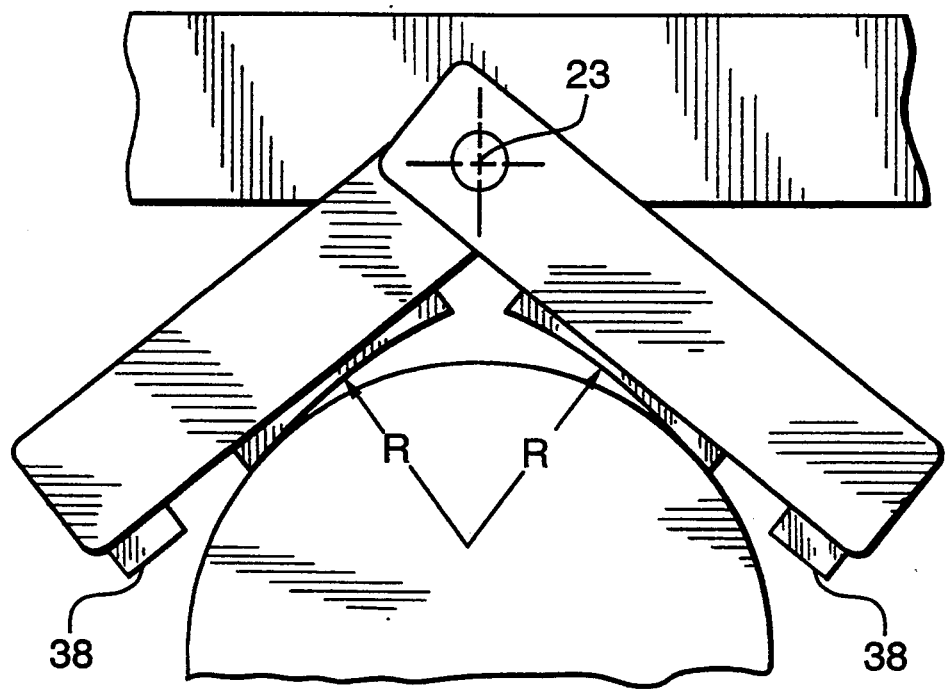
FIG. 6 is an end view of a magnetic bed portion of the cart.
Figure 7:
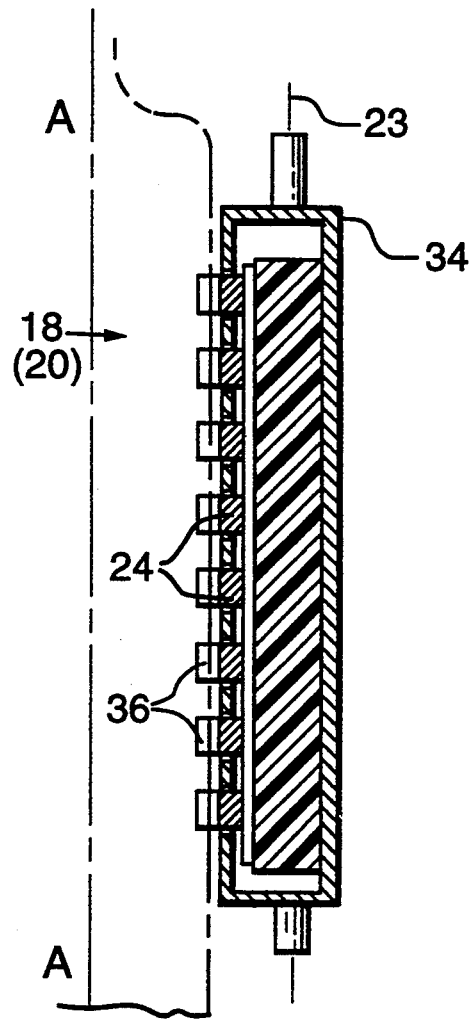
FIG. 7 is a section view taken at 7—7 of FIG. 6.

Referring to FIGS. 6 and 7, each magnetic half-bed 18,20 comprises a shallow rectangular casing 34 having as many as fifteen or more permanent magnets 24 resiliently mounted therein, with the outer faces 36 thereof located outside the front of the casing 34, in a laterally extending direction relative to the cylinder main axis A—A.

The outer faces 36 of magnets 24 may be longitudinally radiused with radius R to a preferred size of cylinder, such as for a four and one half inch, or a nine inch diameter, or for a compromise intermediate radius of curvature. Roll stops 38 at the outer edges of each casing 34 preclude roll-off of the cylinders during transportation.

Alternative magnet arrangements may comprise a larger number of shorter, plain faced magnets so resiliently mounted as to readily conform to the respective cylindrical surface curvature of the cylinder being transported.

A further alternative contemplated is a magnetic bed portion wherein the magnets are oriented substantially parallel with the cylinder main axis. In one such arrangement the magnets may be mounted on a series of semi-flexible bands, having the band outer ends substantially free to flex-to and wrap about the cylinder in gripping relation therewith.

In operation of the cart 10, on approach to a pair of up-ended cylinders the cart is rotated on its front wheels to a vertical orientation, so as to gently slap the four magnetic half beds 18,20 against the curved walls of the two cylinders. This contact, which may require repetition, produces coarse adjustment of the magnetic plates 22 about their respective pivot points 23, bringing the plates 22 into index with the abutting cylindrical surface of the cylinders.

At the same time, the individual seating of the respective magnets 24 is enhanced, in magnetic gripping arrangement with the cylindrical ferritic face of the cylinder. Rearward tilting of the cart 10 tilts the cylinders rearwardly, along with the cart, thereby raising the bottoms of the cylinders clear of the ground as the cart is returned to rest on its castoring wheels 14, for wheeling away. This tilting action serves to introduce a frictional force component acting on the cylinder to reduce the component of cylinder weight requiring magnetic retention, so as to effectively create an enhanced safety margin of magnetic gripping force.

The provision of a safety belt for securing the cylinders to the cart is contemplated. Such a belt may be of resilient construction and feature VELCRO (TM) hook and loop fastening elements.

In order to stack the cylinders in a free-standing position for use, the action of the cart is reversed, thereby returning the cart to an upright position, with the cylinders standing upon their ends. Downward foot pressure against the foot pedal 32 pulls the rods 30 downwardly, causing the cam plates 26 to pivot about their respective pivotal axes 29 and bear against the respective cylinders. This action exerts considerable mechanical force against the cylinders, with an equal and opposite reaction to the cart 10, thereby pushing the magnetic beds 16 clear of magnetic inter-action with the cylinders, and thus permitting free withdrawal and removal of the cart 10.

It will be understood that the cart 10 in accordance with the present invention permits the picking-up of a cylinder or cylinders from a location when standing flush, adjacent a wall, and the repositioning of cylinders directly from the cart by deposition of the cylinders in a similar limiting location flush against a wall or other barrier.

INDUSTRIAL APPLICABILITY

Hand carts are used widely in the handling of portable gas cylinders in a range of sizes.

What is claimed:

1. A cylinder handling cart for transporting ferrous gas cylinders, said cart having a frame, support means to facilitate movement of the cart across a supporting surface, at least one upwardly extending magnetic bed having a lateral extent less than the diameter of said cylinder and mounted on said cart, in use to make adhering contact of said magnetic bed with an outer minor arc portion of the adjacent cylindrical surface of said cylinder, to secure said cylinder to said cart, means for propelling said cart when loaded with said cylinder, and displacement means including cam means to provide relative displacement between said magnetic bed and said cylinder, to release said cylinder from adhering contact with said magnetic bed.

2. A cylinder handling cart for transporting ferrous gas cylinders, said cart having a frame, support means including a first pair of wheels to facilitate movement of the cart across a supporting surface, at least one magnetic bed mounted on said cart, in use to make adhering contact of said magnetic bed with said cylinder, to secure said cylinder to said cart, said magnetic bed having at least two portions thereof movable relative to each other, for adaption thereof to the radius of curvature of said cylinder, being substantially conformable relative to said cylinder, to bring magnetic portions of said bed into adjoining, attractive relation cylindrical surface portions of said cylinder, said cart having a second pair of wheels spaced from said first pair of wheels, said cart including displacement means including cam means to provide relative displacement between said magnetic bed and said cylinders, to release said cylinder from adhering contact with said magnetic bed.

* * * * *

UNITED STATES PATENT AND TRADEMARK OFFICE
CERTIFICATE OF CORRECTION

PATENT NO. : 5,340,136
DATED : August 23, 1994
INVENTOR(S) : Ralph M. MacNeil et al.

It is certified that error appears in the above-identified patent and that said Letters Patent is hereby corrected as shown below:

Col. 3, line 17, "care" should be --cart--.

Signed and Sealed this

Twenty-eight Day of February, 1995

Attest:

BRUCE LEHMAN

Attesting Officer     Commissioner of Patents and Trademarks